(12) United States Patent
Choi

(10) Patent No.: US 8,806,167 B2
(45) Date of Patent: Aug. 12, 2014

(54) BROADCAST RECEIVING APPARATUS AND METHOD FOR MANAGING MEMORY THEREOF

(75) Inventor: Young-ho Choi, Gunpo-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 747 days.

(21) Appl. No.: 12/640,057

(22) Filed: Dec. 17, 2009

(65) Prior Publication Data

US 2010/0325369 A1 Dec. 23, 2010

(30) Foreign Application Priority Data

Jun. 23, 2009 (KR) ........................ 10-2009-0056024

(51) Int. Cl.
*G06F 12/02* (2006.01)
*G06F 9/50* (2006.01)
(52) U.S. Cl.
CPC .............. *G06F 12/02* (2013.01); *G06F 12/023* (2013.01); *G06F 9/5016* (2013.01)
USPC .......................................... 711/170; 711/173
(58) Field of Classification Search
CPC ...... G06F 12/02; G06F 12/023; G06F 9/5016
USPC .................................................. 711/170, 173
See application file for complete search history.

(56) References Cited

U.S. PATENT DOCUMENTS

| | | | | |
|---|---|---|---|---|
| 2002/0184484 | A1* | 12/2002 | Abboud et al. | 713/100 |
| 2006/0085494 | A1* | 4/2006 | Dussud et al. | 707/206 |
| 2008/0222380 | A1* | 9/2008 | Sze et al. | 711/170 |
| 2009/0125699 | A1 | 5/2009 | Beadnell et al. | |
| 2009/0150633 | A1* | 6/2009 | Lee et al. | 711/165 |

OTHER PUBLICATIONS

Extended European Search Report issued Nov. 5, 2010 in counterpart European Application No. 10157425.9.

* cited by examiner

*Primary Examiner* — Than Nguyen
(74) *Attorney, Agent, or Firm* — Sughrue Mion, PLLC

(57) ABSTRACT

A broadcast receiving apparatus and a method for managing a memory are provided. The method for managing a memory includes setting a part of a memory to be a first memory area to be used for a first operating system; setting a portion of the memory which is not set as the first memory area to be a second memory area; and if a second operating system uses the memory, expanding the first memory area to include at least part of the second memory area. Therefore, the broadcast receiving apparatus uses a plurality of operating systems.

33 Claims, 4 Drawing Sheets

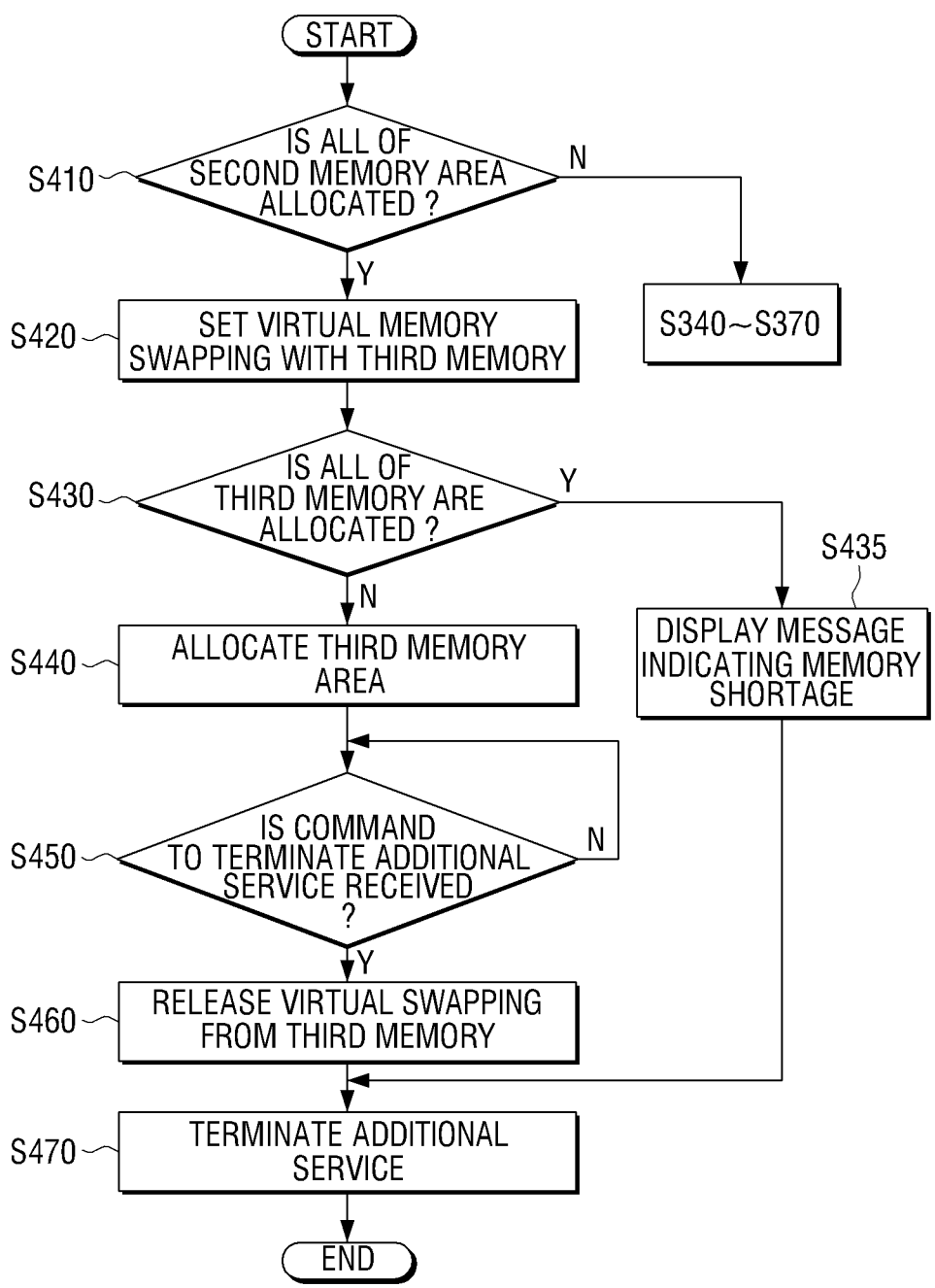

BROADCAST RECEIVING APPARATUS AND METHOD FOR MANAGING MEMORY THEREOF

CROSS-REFERENCE TO RELATED APPLICATIONS

This application claims priority from Korean Patent Application No. 10-2009-0056024, filed on Jun. 23, 2009, in the Korean Intellectual Property Office, the disclosure of which is incorporated herein by reference in its entirety.

BACKGROUND

1. Field

Apparatuses and methods consistent with the inventive concept relate to a broadcast receiving apparatus and a method for managing a memory thereof, and more particularly, to a broadcast receiving apparatus which efficiently uses an operating system by adaptively allocating a memory and a method for managing a memory thereof.

2. Description of the Related Art

A broadcast receiving apparatus refers to an apparatus which receives digital satellite broadcast signals. The broadcast receiving apparatus converts a video signal and an audio signal received from a digital or analog broadcast by a broadcast station, and various external devices such as a video player, a digital versatile disc (DVD) player, or a blue ray disc player into a transmission stream (TS) signal, and transmits the TS signal to an external display apparatus. The digital broadcast apparatus may be an internet protocol television (IPTV) and a set top box (STB) such as a digital television (TV), or a video on demand (VOD).

Recently, broadcast receiving apparatuses have been rapidly developed, and provide additional services such as internet access or game playing ability, in addition to a basic service for playing back a broadcast signal.

Since related-art broadcast receiving apparatuses use a single operating system, if a problem regarding using additional services occurs on the related-art broadcast receiving apparatuses, it may be difficult to provide a basic service.

In addition, as the capacity of a memory mounted in the broadcast receiving apparatus is quite limited, the memory shortage which frequently occurs when additional services are provided causes the broadcast receiving apparatus to stop operating.

SUMMARY

Exemplary embodiments address at least the above problems and/or disadvantages and other disadvantages not described above. Also, the exemplary embodiments are not required to overcome the disadvantages described above, and an exemplary embodiment may not overcome any of the problems described above.

One or more exemplary embodiments provide a broadcast receiving apparatus which adaptively allocates a memory in order to continue providing a basic service of a broadcast receiving apparatus even if an additional service of the broadcast receiving apparatus is used, and a method for managing a memory thereof.

According to an exemplary embodiment, there is provided a method for managing a memory, including setting a part of a memory to be a first memory area to be used for a plurality of operating systems; setting memory which is not set as the first memory area to be a second memory area; and if one of the plurality of operating systems uses the memory, expanding the first memory area to include at least part of the second memory area.

The expanding the first memory area may include recognizing a selection of a service which is based on one of the plurality of operating systems; and additionally allocating at least part of unused area of the second memory area to the first memory area.

The method may further include resetting at least part of the second memory area which is included in the additionally allocated part of the first memory area to be included in the second memory area if the selected service is terminated.

The resetting may include backing up data recorded to provide the selected service among data recorded in the second memory area to the first memory area; and resetting at least part of the second memory area included in the first memory area to be reallocated to the second memory area.

The plurality of operating systems may include a first operating system and a second operating system, wherein the first operating system may be used to provide a basic service of a broadcast receiving apparatus, and the second operating system may be used to provide an additional service of the broadcast receiving apparatus.

The method may further include setting an additional memory separate from the memory including the first and second memory areas, to be a third memory area.

The method may further include expanding the memory to include at least part of the third memory area if one of the plurality of operating systems uses the memory.

The method may further include recognizing a selection of a service which is based on one of the plurality of operating systems; and additionally allocating at least part of unused area of the third memory area to the first memory area.

The method may further include resetting at least part of the third memory area which is included in the expanded part of the first memory to be reallocated to the third memory area if the selected service is terminated.

According to another exemplary embodiment, there is provided a broadcast receiving apparatus, including a storage unit which comprises a first memory area which is set to be used in a plurality of operating systems and a second memory area which is not set as the first memory area; and a controlling unit which controls the first memory area to be expanded to include at least part of the second memory area if one of the plurality of operating systems uses the storage unit.

The apparatus may further include a manipulation unit which receives a selection of a service which is based on one of the plurality of operating systems; wherein the controlling unit additionally allocates at least part of unused area of the second memory area to the first memory area if the service is selected through the manipulation unit.

The controlling unit may reset at least part of the second memory area which is included in the additionally allocated part to be reallocated to the second memory area if the selected service is terminated.

The controlling unit may back up data recorded to provide the selected service among data recorded in the second memory area to the first memory area; and resets at least part of the second memory area included in the first memory area to be reallocated to the second memory area.

The plurality of operating systems may include a first operating system and a second operating system, wherein the first operating system may be used to provide a basic service of the broadcast receiving apparatus, and the second operating system may be used to provide an additional service of the broadcast receiving apparatus.

The apparatus may further include a recording medium which is separate from the storage unit, and is set to be a third memory area.

The controlling unit may expand the memory into at least part of the third memory area if one of the plurality of operating systems uses the storage unit.

The apparatus may further include a manipulation unit which receives a selection of a service which is based on one of the plurality of operating systems; wherein the controlling unit may additionally allocate at least part of unused area of the third memory area to the first memory area if the service is selected through the manipulation unit.

The controlling unit may reset at least part of the third memory area which is included in the expanded first memory area to be reallocated to the third memory area if the selected service is terminated.

According to another exemplary embodiment, there is provided a broadcast receiving apparatus, including a first storage unit which comprises a first memory area which is set to be used in a plurality of operating systems and a second memory area which is not set as the first memory area; a second storage unit which is disposed separate from the first storage unit; and a controlling unit which controls the first memory area to be expanded into at least part of the second memory area if one of the plurality of operating systems uses the first memory area.

BRIEF DESCRIPTION OF THE DRAWINGS

The above and/or other aspects will be more apparent by describing certain exemplary embodiments with reference to the accompanying drawings, in which:

FIG. 4 is a flowchart provided to explain an operating method of a broadcast receiving apparatus according to another exemplary embodiment.

DETAILED DESCRIPTION OF EXEMPLARY EMBODIMENTS

Figure 1:
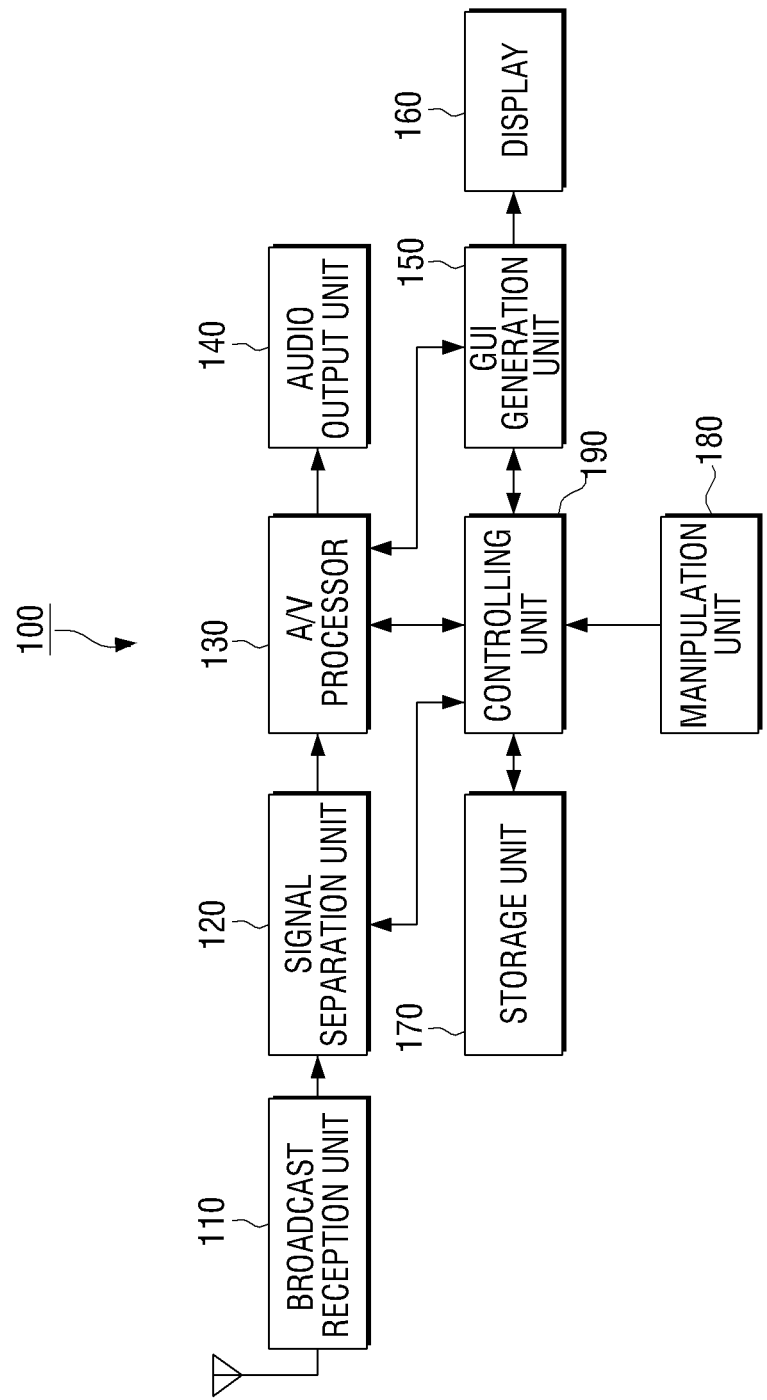
FIG. 1 is a block diagram illustrating a broadcast receiving apparatus according to an exemplary embodiment.

Certain exemplary embodiments will now be described in greater detail with reference to the accompanying drawings.

In the following description, the same drawing reference numerals are used for the same elements even in different drawings. The matters defined in the description, such as detailed construction and elements, are provided to assist in a comprehensive understanding of the invention. Thus, it is apparent that the exemplary embodiments can be carried out without those specifically defined matters. Also, well-known functions or constructions are not described in detail since they would obscure the invention with unnecessary detail.

FIG. 1 is a block diagram illustrating a broadcast receiving apparatus according to an exemplary embodiment. In the exemplary embodiment, an operating system used in a broadcast receiving apparatus 100 is limited to the first and second operating systems for convenience of description. Herein, the first operating system is used to provide a basic service of the broadcast receiving apparatus 100, and the second operating system is used to provide additional services of the broadcast receiving apparatus 100.

The basic service represents a service for reproducing a broadcast signal corresponding to a tuned channel or an image signal corresponding to a selected image, which is an original function of the broadcast receiving apparatus 100, and the additional services represent services such as providing internet access, game playing, and so on.

Referring to FIG. 1, the broadcast receiving apparatus 100 according to the exemplary embodiment comprises a broadcast reception unit 110, a signal separation unit 120, an audio and video (A/V) processor 130, an audio output unit 140, a graphical user interface (GUI) generation unit 150, a display 160, a storage unit 170, a manipulation unit 180, and a controlling unit 190.

The broadcast reception unit 110 receives a broadcast from a broadcast station or a satellite over a wired connection or wirelessly, and demodulates the received broadcast.

The signal separation unit 120 separates a broadcast signal into an image signal, an audio signal, and an additional information signal. The signal separation unit 120 transmits an image signal and an audio signal to the A/V processor 130.

The A/V processor 130 processes an image signal and an audio signal input from the broadcast reception unit 110 or the storage unit 170 in a manner of video decoding, video scaling, audio decoding, and so on. The A/V processor 130 outputs an image signal to the GUI generation unit 150, and an audio signal to the audio output unit 140.

Alternatively, if the received image and audio signals are stored in the storage unit 170, the A/V processor 130 transmits image data and audio data to the storage unit 170 in a compressed format.

The audio output unit 140 converts an audio signal output from the A/V processor 130 into sound, and outputs the sound via a speaker (not shown) or to an external device being connected through an external output terminal (not shown).

The GUI generation unit 150 generates a GUI to be provided to a user. The GUI generation unit 150 adds the generated GUI on an image which is output from the A/V processor 130. The display 160 displays an image including the GUI.

The storage unit 170 includes a first memory area to use a plurality of operating systems operated in the broadcast receiving apparatus 100 and a second memory area to provide a basic service of the broadcast receiving apparatus 100.

The first memory area is preset to use the first operating system which provides a basic service and the second operating system which provides additional services, and the second memory area is preset to record data which are used while the basic service is provided.

Herein, the basic service may be a service for reproducing a broadcast signal or an image signal, which is an original function of the broadcast receiving apparatus 100, and the second memory area may be used to decode a broadcast signal or an image signal.

The storage unit 170 may be implemented by a hard disc, a non-volatile memory, a volatile memory, and so on.

The manipulation unit 180 may be implemented by a touchscreen, a touch pad, a key pad, a key button, and so on, and enables a user to manipulate the broadcast receiving apparatus 100.

Specifically, the manipulation unit 180 receives a user's input regarding whether the broadcast receiving apparatus 100 provides a basic service or an additional service, and transmits a command to perform a basic service or a command to perform an additional service to the controlling unit 190 which will be explained later.

In addition, the manipulation unit 180 receives a command to terminate a basic service or an additional service being provided by the broadcast receiving apparatus 100 from a user, and transmits the command to terminate a basic service or an additional service to the controlling unit 190, which will be explained later.

The controlling unit 190 controls overall operations of the broadcast receiving apparatus 100. If a command to perform an additional service is input through the manipulation unit 180, the controlling unit 190 sets virtual memory swapping to enable the second memory area to be used as the first memory area. That is, the controlling unit 190 expands the first memory area to include at least a portion of the second memory area.

For example, if the entire capacity of the storage unit 170 is to be 510 Mbyte, the entire capacity of the first memory area may be set at 210 Mbyte, and the entire capacity of the second memory area may be set at 300 Mbyte. The controlling unit 190 may set the entire capacity of the first memory area to be 510 Mbyte in order for the second memory area to be used as the first memory area, if a command to perform an additional service is input through the manipulation unit 180. Alternatively, the controlling unit 190 may set a part of the second memory, not the entire capacity of the second memory area, to be used as the first memory area.

Furthermore, the controlling unit 190 determines whether or not all of the first memory area and all of the second memory area are allocated using a first counter and a second counter. The first counter is used to detect whether or not all of the first memory area, a memory for an operating system, is allocated, and the second counter is used to detect whether or not all of the second memory area, a memory for an apparatus, is allocated.

If all of the first memory area is allocated, and a part of the second memory area is empty, the controlling unit 190 may allocate a memory space needed to provide an additional service in the empty part of the second memory area. If all of the first and second memory areas is allocated, the controlling unit 190 controls the GUI generation unit 150 to display a message indicating a memory shortage on the display 160.

For example, if a first reference value is set to be 21, a second reference value is set to be 30, and a counting unit of the memory area is set to be 1000 kbyte, the controlling unit 190 increases the first counter by 1 whenever 1000 kbyte of the first memory area is allocated. If the first counter reaches the first reference value which is preset, the controlling unit 190 determines that all of the first memory area is allocated.

In the same way as above, whenever 1000 kbyte of the second memory area is allocated, the controlling unit 190 increases the second counter by 1. If the second counter reaches the second reference value which is preset, a message indicating a memory shortage is displayed on the display 160 under the control of the controlling unit 190.

If it is determined that all of the first memory area is allocated, and a part of the second memory area is not allocated by referring to the first and second counters, the controlling unit 190 records data that is used to provide an additional service in the second memory area. By doing so, the controlling unit 190 allocates the memory area required to provide the additional service to the second memory area.

If a command to terminate an additional service is input through the manipulation unit 180, the controlling unit 190 releases the virtual memory swapping from the second memory area. That is, the controlling unit 190 withdraws the second memory area from the expanded first memory area in order to release the virtual memory swapping from the second memory area. The controlling unit 190 backs up data recorded in the second memory area to the first memory area before releasing the virtual memory swapping from the second memory area, and then releases the virtual memory swapping between the first memory and the second memory.

Specifically, if a command to terminate an additional service is input through the manipulation unit 180, the controlling unit 190 backs up the data recorded in the second memory area to provide an additional service to the first memory area. Referring to the previous example, if the operation of backing up data is completed, the controlling unit 190 sets the entire capacity of the first memory area, which was increased to 510 Mbyte, to be 210 Mbyte, and sets the second memory area to be 300 Mbyte in order to release the virtual memory swapping from the second memory area.

If a command to perform a basic service is input from the manipulation unit 180, the controlling unit 190 controls the broadcast reception unit 110, the signal separation unit 120, the A/V processing unit 130, and the GUI generation unit 150 to provide a basic service. The controlling unit 190 controls elements of the broadcast receiving apparatus 100 so as to display a broadcast signal or an image signal on the display 160.

Figure 2:
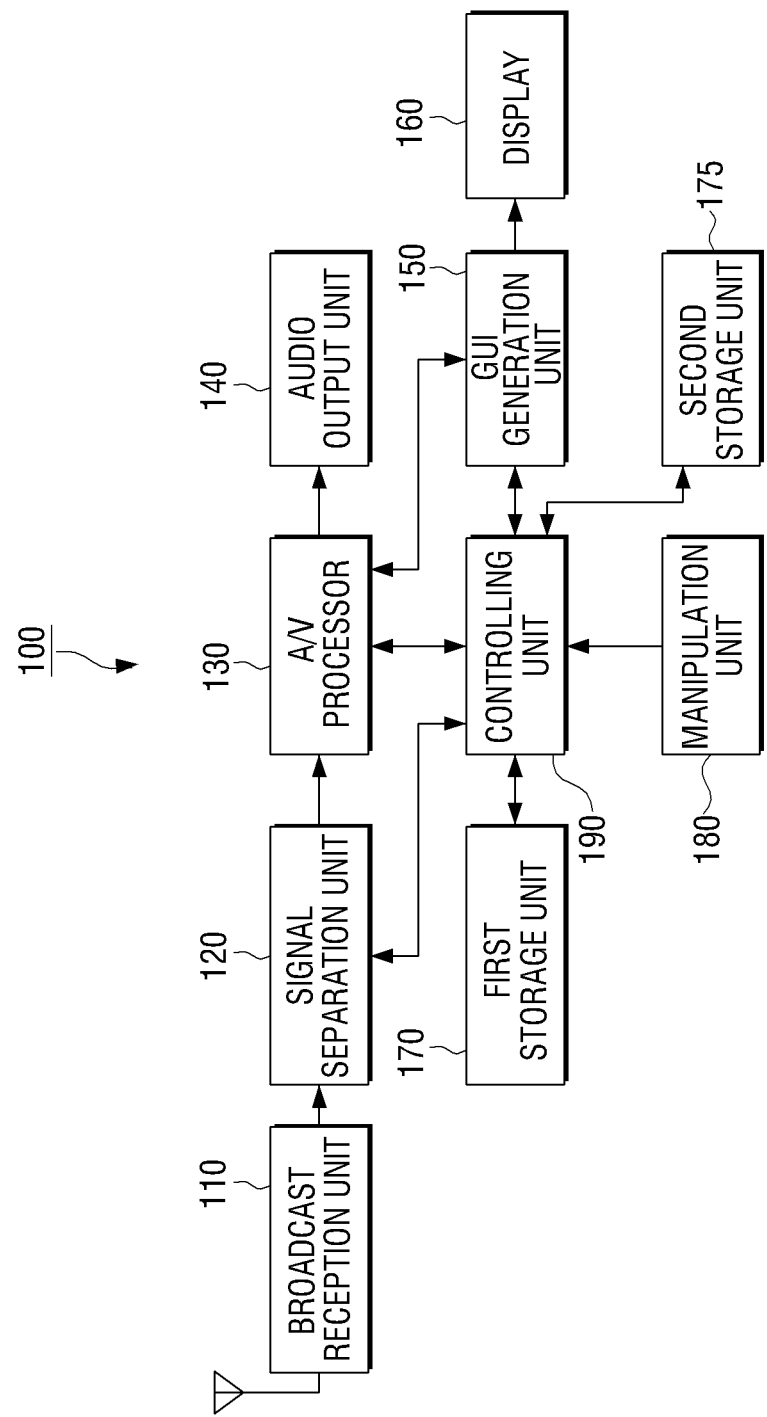
FIG. 2 is a block diagram illustrating a broadcast receiving apparatus according to another exemplary embodiment.

FIG. 2 is a block diagram illustrating a broadcast receiving apparatus according to another exemplary embodiment. The same reference numerals will be used for elements which perform the same operations as those of FIG. 1. According to the exemplary embodiment, a second storage unit 175 is additionally mounted in the broadcast receiving apparatus 100, in addition to the elements illustrated in FIG. 1, and a first storage unit 170 performs the same operation as that of the storage unit 170 of FIG. 1. Accordingly, the like elements illustrated in FIGS. 1 and 2 will not be explained in detail.

The second storage unit 175 is mounted in a controlling device (not shown) which is provided to perform a predetermined operation of the broadcast receiving apparatus 100, and is physically spaced apart from the first storage unit 170. The second storage unit 175 may be implemented by a nonvolatile memory or a volatile memory, and may be a memory mounted in a central processing unit (CPU).

If a command to perform an additional service is input through the manipulation unit 180, the controlling unit 190 sets virtual memory swapping between the first storage unit 170 and the second storage unit 175. That is, the controlling unit increases the capacity of the first storage unit 170 by an amount equal to the capacity of the second storage unit 175. In this situation, the controlling unit 190 sets virtual memory swapping between the first storage unit and a part of the second storage unit.

The controlling unit 190 determines whether or not all of the first storage unit 170 and all of the second storage unit 175 are allocated using the first, second and third counters. If it is determined that the entire first storage unit 170 is allocated, and a part of the second storage unit 175 is not allocated, the controlling unit 190 allocates a memory space needed to provide an additional service in the empty part of the second storage unit 175.

If it is determined that all of the first and second memory areas of the first storage unit 170 are allocated based on the first and second counters, and there is an empty part in the second storage unit 175 based on the third counter, the controlling unit 190 allocates a memory space needed to provide an additional service to the second storage unit 175. That is, the controlling unit 190 records data which are used to provide an additional service in the second storage unit 175.

If all of the first and second memory areas of the first storage unit 170 and all of memory space of the second storage unit 175 are allocated, the controlling unit 190 controls the GUI generation unit 150 to display a message indicating memory shortage on the display 160.

As the method for determining whether or not all of the first and second storage units 170 and 175 is allocated using the first, second, and third counters is the same as the method for determining whether or not all of the first and second memory areas is allocated using the first and second counters, a detailed description will be omitted.

If a command to terminate an additional service is input through the manipulation unit 180, the controlling unit 190 releases the virtual memory swapping from the second storage unit 175. The operation of releasing virtual memory swapping from the second storage unit 175 is the same as the operation of releasing virtual memory swapping from the second memory area, and thus a detailed description will be omitted.

Figure 3:
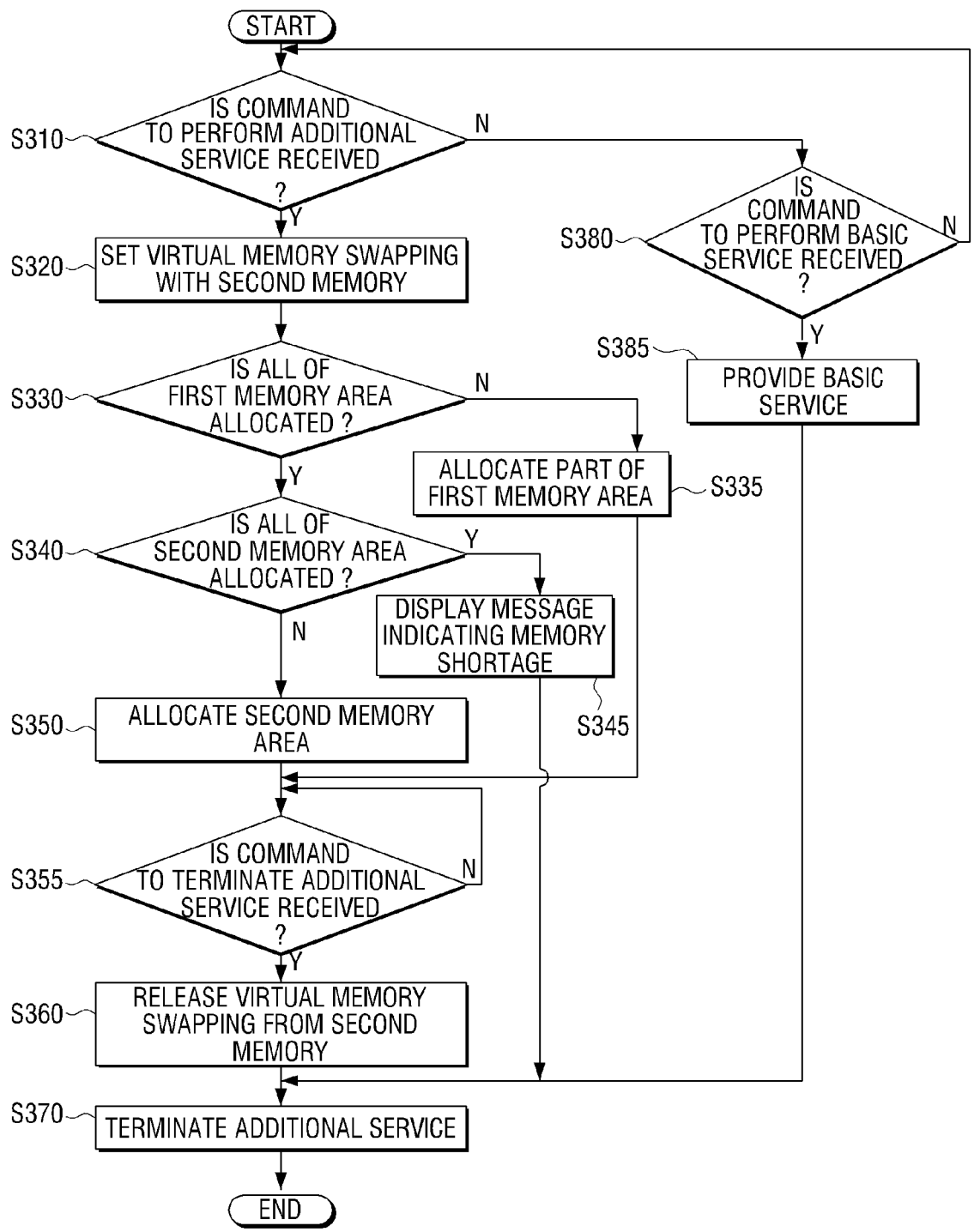
FIG. 3 is a flowchart provided to explain an operating method of a broadcast receiving apparatus according to an exemplary embodiment.

FIG. 3 is a flowchart provided to explain an operating method of a broadcast receiving apparatus according to an exemplary embodiment.

If a command to perform an additional service is received (S310:Y), the controlling unit 190 sets virtual memory swapping with the second memory (S320). The additional service may be internet access, game playing, and so on which are provided by the broadcast receiving apparatus 100.

If a command to perform an additional service is received from a user using the manipulation unit 180, the controlling unit 190 sets virtual memory swapping, in which the first memory area is expanded to include at least a portion of the second memory area. For example, if the entire capacity of the storage unit 170 is set to be 510 Mbyte, the entire capacity of the first memory area is set to be 210 Mbyte, and the entire capacity of the second memory area is set to be 300 Mbyte, the controlling unit 190 increases the entire capacity of the first memory area to be between 210 Mbyte and 510 Mbyte.

The controlling unit 190 detects whether or not all of the first memory area is allocated (S330).

Specifically, if a first reference value is set to be 21, a second reference value is set to be 30, and a counting unit of the memory area is set to be 1000 kbyte, the controlling unit 190 increases the first counter by 1 whenever 1000 kbyte of the first memory area is allocated. If the first counter reaches the preset first reference value, the controlling unit 190 determines that all of the first memory area is allocated.

If it is not determined that all of the first memory area is allocated (S330:N), the controlling unit 190 allocates a part of the first memory area, and provides an additional service (S335). That is, the controlling unit 190 records data needed to provide an additional service in the allocated part of the first memory area.

If it is determined that all of the first memory area is allocated (S330:Y), the controlling unit 190 detects whether or not all of the second memory area is allocated (S340).

Specifically, the controlling unit 190 increases the second counter by 1 whenever 1000 kbyte of the second memory area is allocated, and if the second counter reaches the preset second reference value, the controlling unit 190 determines that all of the second memory area is allocated.

If it is determined that all of the second memory area is allocated (S340:Y), the controlling unit 190 displays a message indicating a memory shortage on the display 160 (S345).

If it is not determined that all of the second memory area is allocated (S340:N), the controlling unit 190 allocates the second memory area, and provides an additional service (S350). That is, the controlling unit 190 records data needed to provide an additional service in the allocated second memory area.

If a command to terminate an additional service is received (S355:Y), the controlling unit 190 releases the virtual memory swapping from the second memory (S360). That is, the controlling unit 190 resets so that the second memory area, which is included in the first memory area in operation S320, is separated from the first memory area, and is reallocated to the second memory area.

Specifically, if a command to terminate an additional service is input through the manipulation unit 180, the controlling unit 190 backs up data recorded in the second memory area to provide an additional service in operation S350 to the first memory area. For example, if the operation of backing up the data is completed, the controlling unit 190 releases the virtual memory swapping from the second memory area by setting the capacity of the first memory area to be 210 Mbyte, and setting the second memory area to be 300 Mbyte.

After the virtual memory swapping is released from the second memory area, the controlling unit 190 terminates an additional service (S370).

If a command to perform a basic service, not an additional service (S310:N), is received in operation S310 (S380:Y), the controlling unit 190 controls each element of the broadcast receiving apparatus 100 so as to display a broadcast signal or an image signal on the display 160 (S385). The basic service represents a service for reproducing a broadcast signal corresponding to a tuned channel or an image signal corresponding to a selected image, which is an original function of the broadcast receiving apparatus 100.

FIG. 4 is a flowchart provided to explain an operating method of a broadcast receiving apparatus according to another exemplary embodiment.

The exemplary embodiment includes the same operations as operations S310 to S330 of FIG. 3, and thus the same description will be omitted. In addition, if it is not determined that all of the second memory area is allocated (S410:N), the broadcast receiving apparatus performs the same operations as operations S340:N to S370 of FIG. 3, and thus the description regarding this operation will be also omitted. Hereinbelow, operations after operation S340:Y which are different from those of FIG. 3 will be described.

If it is determined that all of the second memory area is allocated, as in operation S340 (S410:Y), the controlling unit 190 sets virtual memory swapping between the second memory and the third memory (S420). That is, the controlling unit 190 increases the capacity of the first storage unit 170 by an amount equal to the capacity of the second storage unit 175. A part or all of the memory area of the second storage unit 175 is preset to be the third memory.

For example, if the entire capacity of the first storage unit 170 is set to be 510 Mbyte, the entire capacity of the second storage unit 175 is set to be 200 Mbyte, and the entire capacity of the second storage unit 175 is set to be the third memory area, the controlling unit 190 sets the entire capacity of the first storage unit 170 to be 710 Mbyte, and sets virtual memory swapping between the first storage unit 170 and the third memory.

The controlling unit 190 detects whether or not all of the third memory area is allocated (S430).

Specifically, whenever 1000 kbyte of the third memory area is allocated, the controlling unit 190 increases the third counter by 1. If the third counter reaches the preset third reference value, the controlling unit 190 determines that all of the third memory area is allocated.

If it is determined that all of the third memory area is allocated (S430:Y), the controlling unit 190 displays a message indicating memory shortage on the display 160 (S435).

If it is not determined that all of the third memory area is allocated (S430:N), the controlling unit 190 allocates an empty part of the third memory area, and provides an additional service (S440). That is, the controlling unit 190 records data needed to provide an additional service in the allocated part of the third memory area.

If a command to terminate an additional service is received (S450:Y), the controlling unit 190 releases the virtual memory swapping from the third memory (S460). That is, the controlling unit 190 resets so that the third memory area, which is included in the first storage unit 170 in operation S420, is separated from the first storage unit 170, and reallocated to the third memory area.

If a command to terminate an additional service is input through the manipulation unit 180, the controlling unit 190 backs up data recorded in the third memory area to provide an additional service in operation S440 to the first storage unit 170. For example, if the operation of backing up data is completed, the controlling unit 190 sets the entire capacity of the first storage unit 170, which was increased to 710 Mbyte, to be 510 Mbyte, and sets the entire capacity of the second storage unit 175 to be 200 Mbyte so that the virtual memory swapping is released from the third memory area.

After the virtual memory swapping is released from the third memory area, the controlling unit 190 terminates an additional service (S470).

In the broadcast receiving apparatus according to the exemplary embodiment, the controlling unit 190 may initialize the third memory area to delete the data from the third memory area after releasing the virtual memory swapping.

If an additional service is terminated, and then a basic service is provided, the controlling unit 190 may overwrite data recorded in the third memory area for the additional service with data for the basic service.

A counting unit of a memory area is set to be 1000 kbyte in the exemplary embodiments, but this is not limited thereto. Alternatively, bytes or pages may be used as a counting unit.

While the first operating system to provide a basic service and the second operation system to provide an additional service are used in the exemplary embodiments, this should not be considered limiting. Three or more operating systems to provide a basic service and a plurality of additional services may be used in the broadcast receiving apparatus according to the exemplary embodiments.

The controlling unit 190 sets virtual memory swapping between the first storage unit 170 and the third memory area in an exemplary embodiment, but this should not be considered limiting. The controlling unit 190 may set virtual memory swapping between a part of the first storage unit 170 and the third memory area. That is, the controlling unit 190 may set virtual memory swapping between the first memory area and the third memory area, or between the second memory area and the third memory.

While the entire capacity of the second storage unit 175 is set to be the third memory in an exemplary embodiment, a part of the second storage unit 175 may be set to be the third memory.

The controlling unit may set virtual memory setting between the first storage unit 170 and a part of the second storage unit 175, or between a part of the first storage unit 170 and a part of the second storage unit 175. In addition, the controlling unit 190 separates a part of the second memory area from the first memory area and sets the part to be included in the second memory area, and separates a part of the third memory area from the first storage unit 170 and sets the part to be included in the second storage unit 175.

According to various exemplary embodiments, an operating system used to provide a basic system and an operating system used to provide an additional service are different from each other. Accordingly, even if a problem in providing an additional service occurs, a basic service may be continuously provided.

When an additional service is used on the broadcast receiving apparatus, a memory may be adaptively allocated so that a memory other than a memory which is allocated for an operating system is used.

The foregoing exemplary embodiments and aspects are merely exemplary and are not to be construed as limiting. The present teaching can be readily applied to other types of apparatuses. Also, the description of the exemplary embodiments of the present invention is intended to be illustrative, and not to limit the scope of the claims, and many alternatives, modifications, and variations will be apparent to those skilled in the art.

What is claimed is:

1. A method for managing a memory, comprising:
   setting a part of a memory to be a first memory area for a first operating system providing a basic service for playing back a broadcast signal;
   setting a part of the memory which is not set as the first memory area to be a second memory area; and
   in response to recognizing a selection of a service of a second operating system, expanding the first memory area to include at least a part of the second memory area for providing an additional service related to a broadcast content.

2. The method as claimed in claim 1, wherein the expanding the first memory area comprises:
   additionally allocating at least a part of unused area of the second memory area to the first memory area.

3. The method as claimed in claim 2, further comprising:
   resetting the second memory area by reallocating the additionally allocated part of the second memory area back to the second memory area, if the selected service is terminated.

4. The method as claimed in claim 3, wherein the resetting comprises:
   backing up data recorded in the second memory area to provide the selected service by recording the data in the first memory area.

5. The method as claimed in claim 1, wherein the second operating system provides the additional service of a broadcast receiving apparatus.

6. The method as claimed in claim 1, wherein the memory is a first memory, the method further comprising:
   setting a second memory, which is separate from the first memory, to be a third memory area.

7. The method as claimed in claim 6, further comprising:
   expanding the first memory to include at least a part of the third memory area if the second operating system or a third operating system uses the first memory.

8. The method as claimed in claim 6, further comprising:
   recognizing a selection of a service which is based on the second or the third operating systems; and
   additionally allocating at least part of unused area of the third memory area to the first memory area.

9. The method as claimed in claim 8, further comprising:
   resetting the third memory area by reallocating the additionally allocated part of the third memory area back to the third memory area, if the selected service is terminated.

10. The method as claimed in claim 9, wherein the resetting further comprises backing up data recorded in the third memory area to provide the selected service by recording the data in the first memory area.

11. The method as claimed in claim 7, wherein the first operating system provides a basic service of the broadcast receiving apparatus, and the second and third operating systems provide additional services of the broadcast receiving apparatus.

12. The method as claimed in claim 2, wherein the additionally allocating occurs if all of the first memory area has been allocated.

13. The method as claimed in claim 2, further comprising: displaying a message indicating a memory shortage if there are no unused areas of the second memory area.

14. The method as claimed in claim 8, wherein the additionally allocating occurs if all of the second memory area has been allocated.

15. The method as claimed in claim 8, further comprising: displaying a message indicating a memory shortage if there are no unused areas of the third memory area.

16. A broadcast receiving apparatus, comprising:
a storage unit which comprises a first memory area which is set for a first operating system providing a basic service for playing back a broadcast signal and a second memory area which is not set as the first memory area; and
a controlling unit which controls the first memory area to be expanded to include at least a part of the second memory area for providing an additional service related to a broadcast content in response to recognizing a selection of a service of a second operating system.

17. The apparatus as claimed in claim 16, further comprising:
a manipulation unit which receives the selection of the service which of the second operating system;
wherein the controlling unit additionally allocates at least a part of unused area of the second memory area to the first memory area if the service is selected through the manipulation unit.

18. The apparatus as claimed in claim 17, wherein the controlling unit resets the second memory area by reallocating the additionally allocated part of the second memory area back to the second memory area, if the selected service is terminated.

19. The apparatus as claimed in claim 18, wherein the controlling unit backs up data recorded in the second memory area to provide the selected service by recording the data in the first memory area.

20. The apparatus as claimed in claim 16, wherein the second operating system provides the additional service of a broadcast receiving apparatus.

21. The apparatus as claimed in claim 16, further comprising:
a recording medium which is separate from the storage unit, and is set to be a third memory area.

22. The apparatus as claimed in claim 21, wherein the controlling unit expands the memory to include at least a part of the third memory area if the second operating system or a third operating system uses the storage unit.

23. The apparatus as claimed in claim 21, further comprising:
a manipulation unit which receives a selection of a service which is based on of the second or the third operating systems;
wherein the controlling unit additionally allocates at least part of unused area of the third memory area to the first memory area if the service is selected through the manipulation unit.

24. The apparatus as claimed in claim 23, wherein the controlling unit resets the third memory area by reallocating the additionally allocated part of the third memory area back to the third memory area, if the selected service is terminated.

25. The apparatus as claimed in claim 24, wherein the controlling unit backs up data recorded in the third memory area to provide the selected service by recording the data in the first memory area.

26. The apparatus as claimed in claim 22, wherein the first operating system provides a basic service of the broadcast receiving apparatus, and the second and third operating systems provide additional services of the broadcast receiving apparatus.

27. The apparatus as claimed in claim 17, wherein the controlling unit additionally allocates at least part of unused area of the second memory area to the first memory area if all of the first memory area has been allocated.

28. The apparatus as claimed in claim 17, further comprising:
a display unit that displays a message indicating a memory shortage if there are no unused areas of the second memory area.

29. The apparatus as claimed in claim 23, wherein the controlling unit additionally allocates at least part of unused area of the third memory area to the first memory area if all of the second memory area has been allocated.

30. The apparatus as claimed in claim 23, further comprising a display unit that displays a message indicating a memory shortage if there are no unused areas of the third memory area.

31. A broadcast receiving apparatus, comprising:
a first storage unit which is used for operating a CPU of the broadcast receiving apparatus;
a second storage unit which is used exclusively for operating a predetermined module and disposed separate from the first storage unit; and
a controlling unit which allocates the second storage unit for performing an additional service related to a broadcast content, when the first storage unit lacks space for performing the additional service.

32. The apparatus as claimed in claim 31, wherein the predetermined module is a graphic card.

33. The apparatus as claimed in claim 31, wherein the controlling unit allocates the second storage unit for performing the additional service related to the broadcast content by performing virtual memory swapping.

* * * * *